Feb. 20, 1962 G. W. MOSSOR 3,021,766
MATERIAL HANDLING APPARATUS
Filed Aug. 5, 1957 11 Sheets-Sheet 2
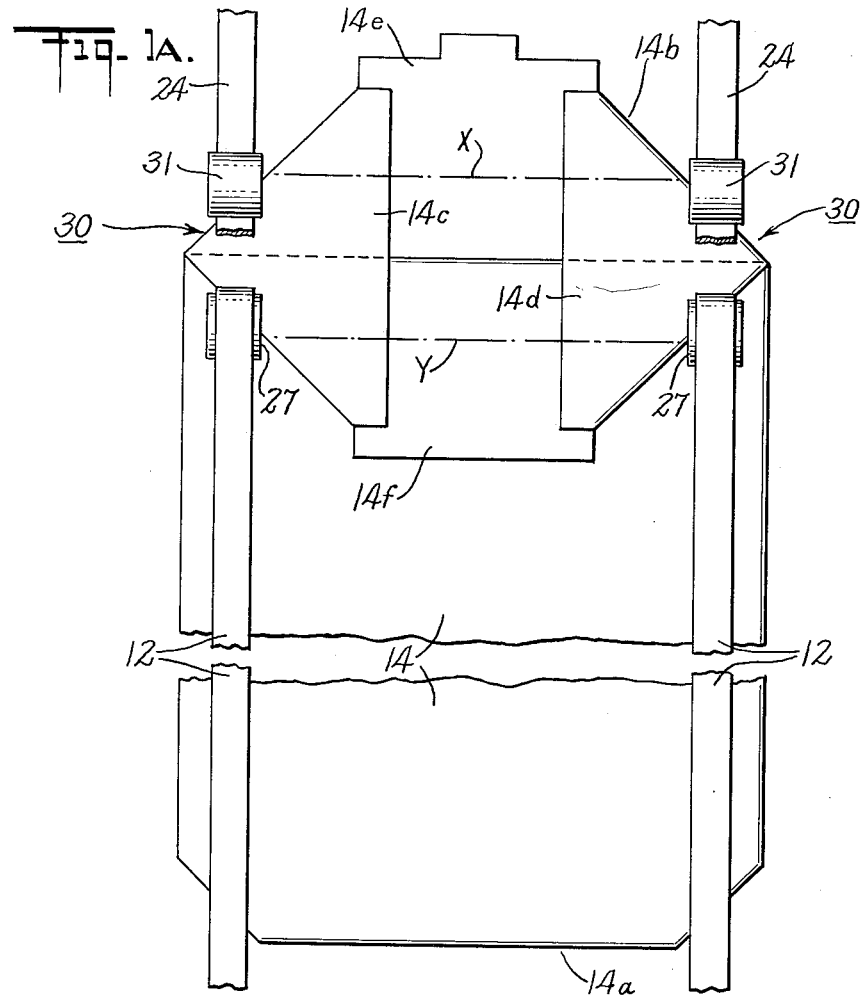
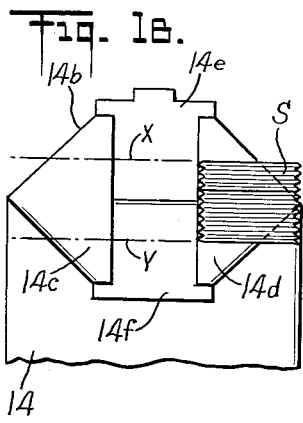
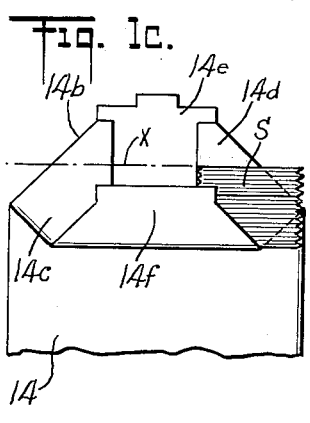
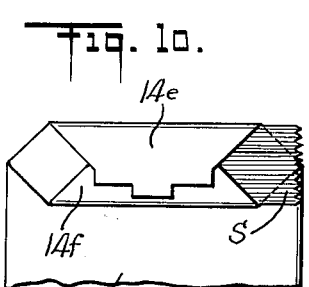
INVENTOR.
George W. Mossor
BY
Curtis Morris + Safford
ATTORNEYS

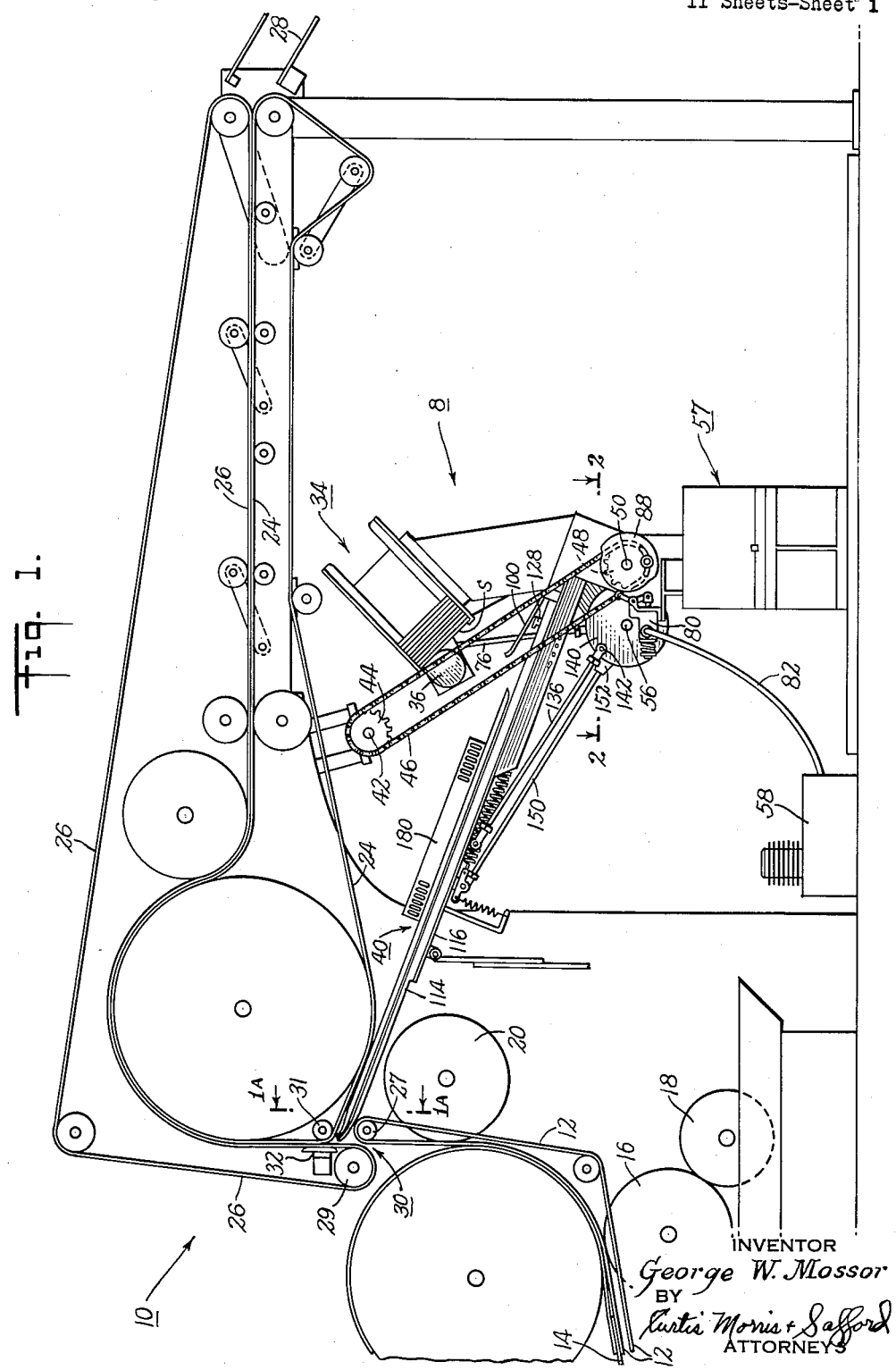

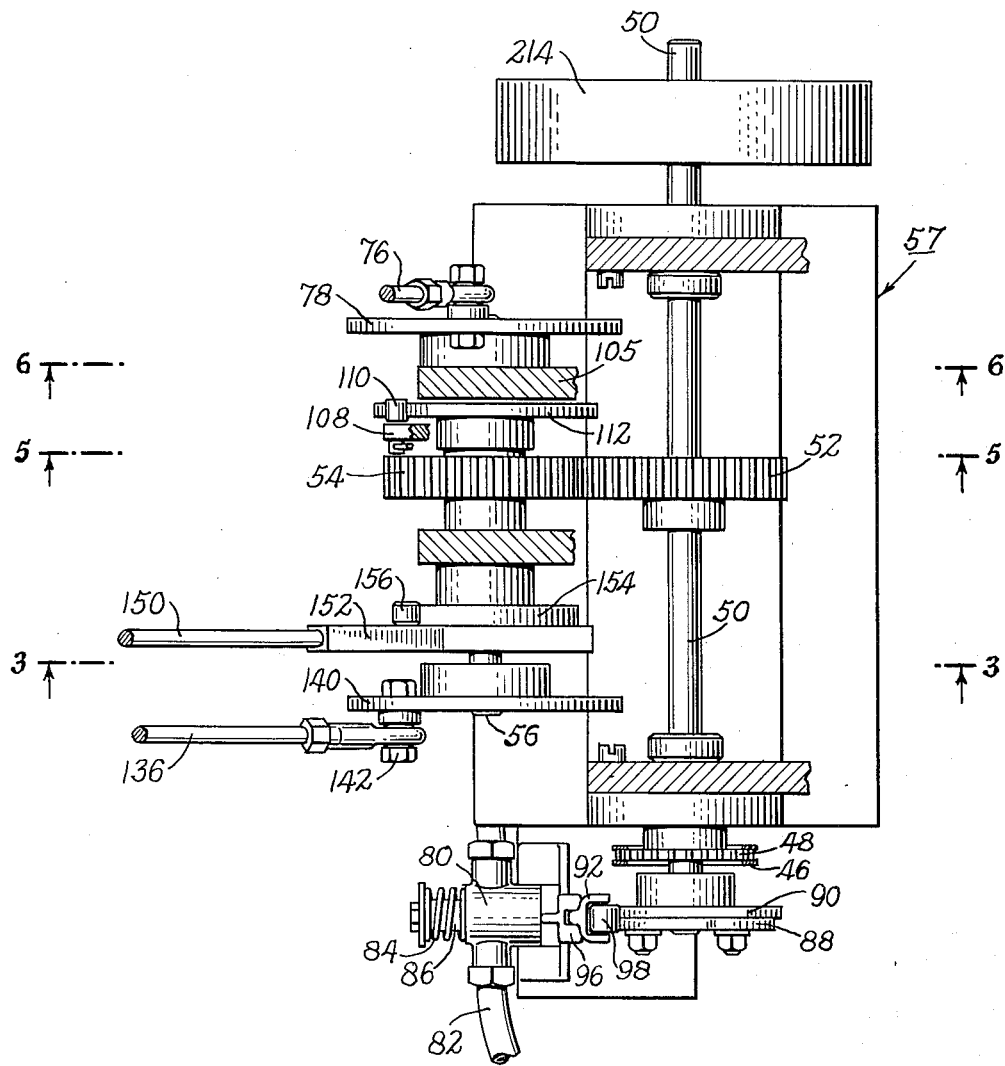

Feb. 20, 1962 G. W. MOSSOR 3,021,766
MATERIAL HANDLING APPARATUS
Filed Aug. 5, 1957 11 Sheets-Sheet 4
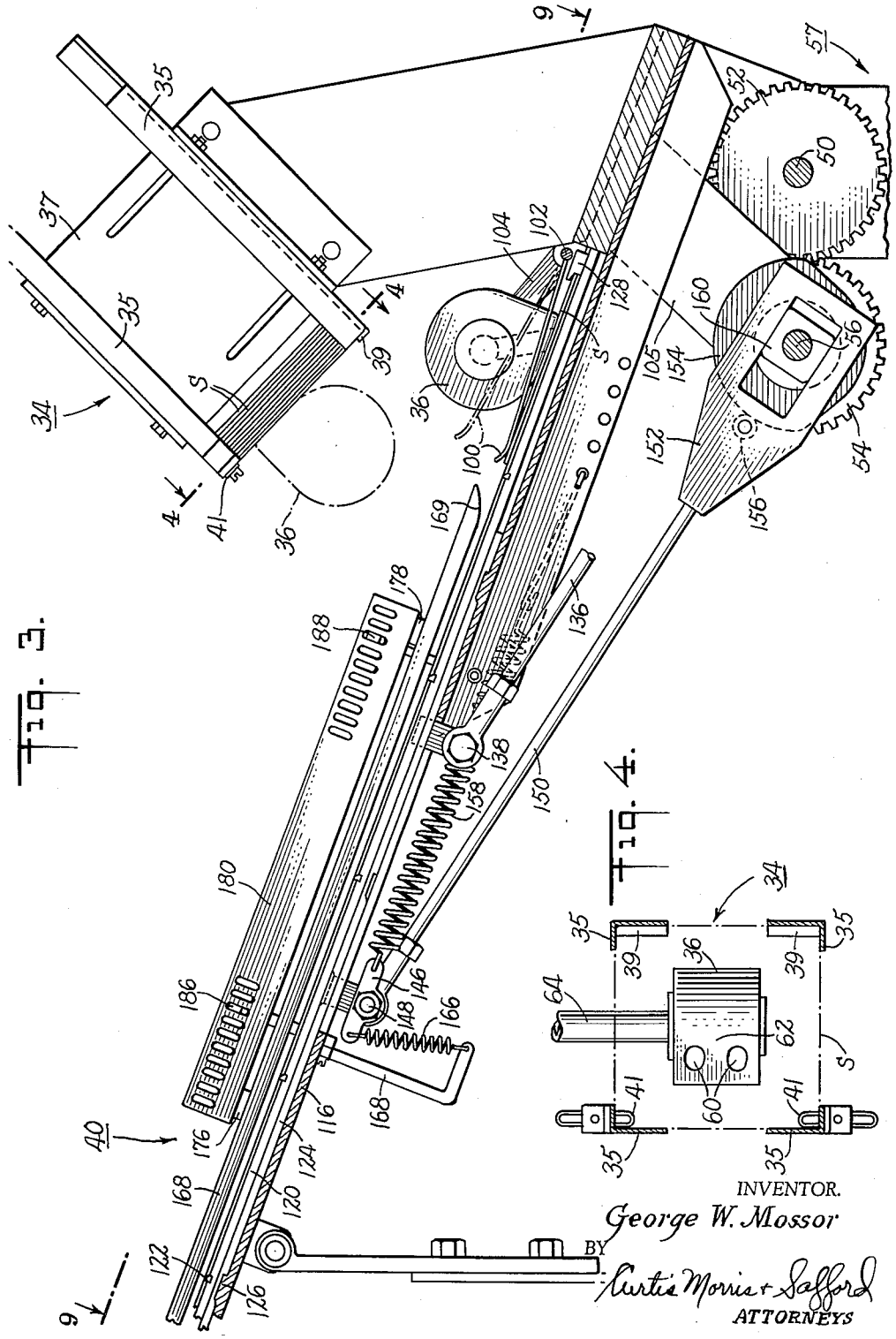
INVENTOR.
George W. Mossor
BY
Curtis, Morris + Safford
ATTORNEYS

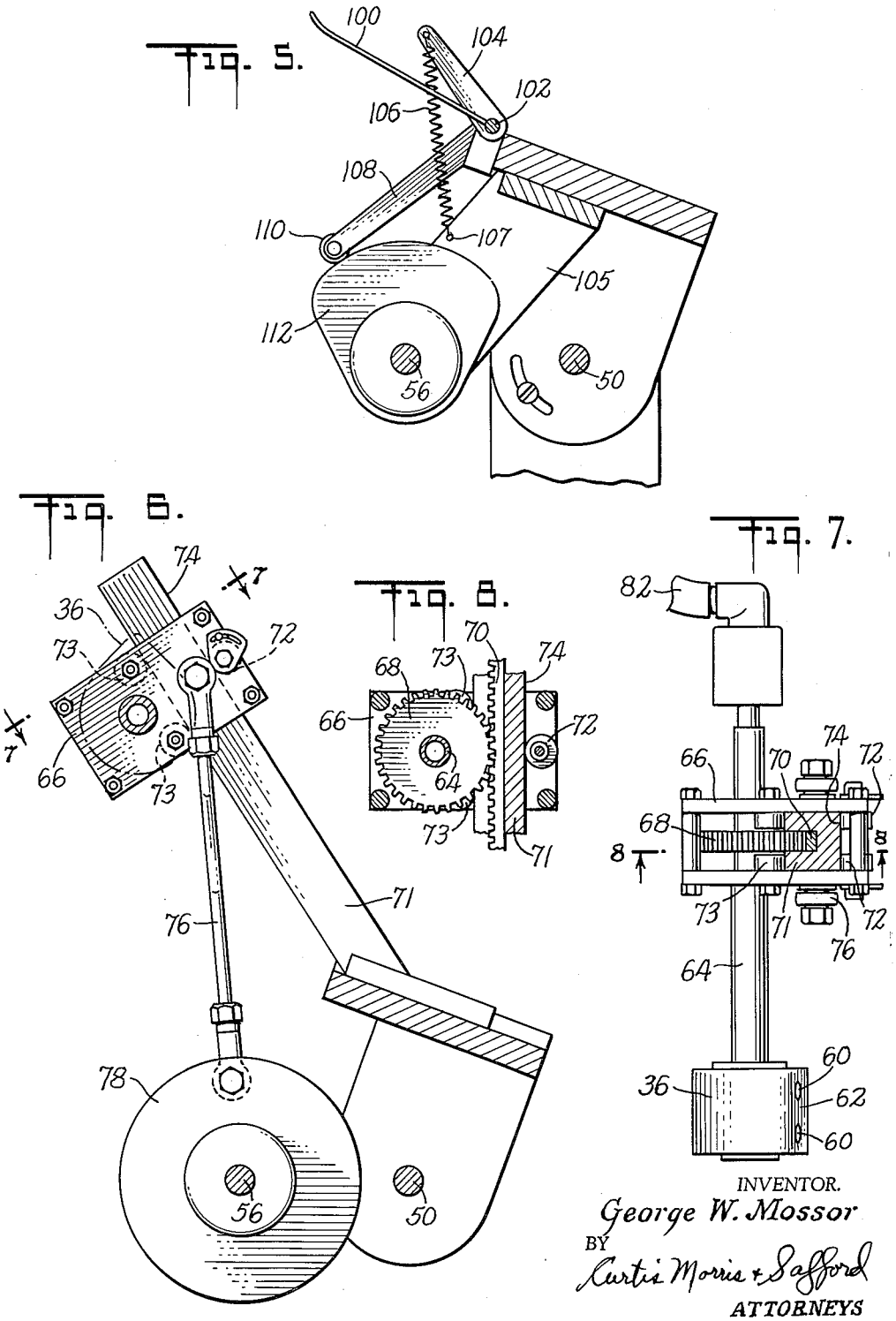

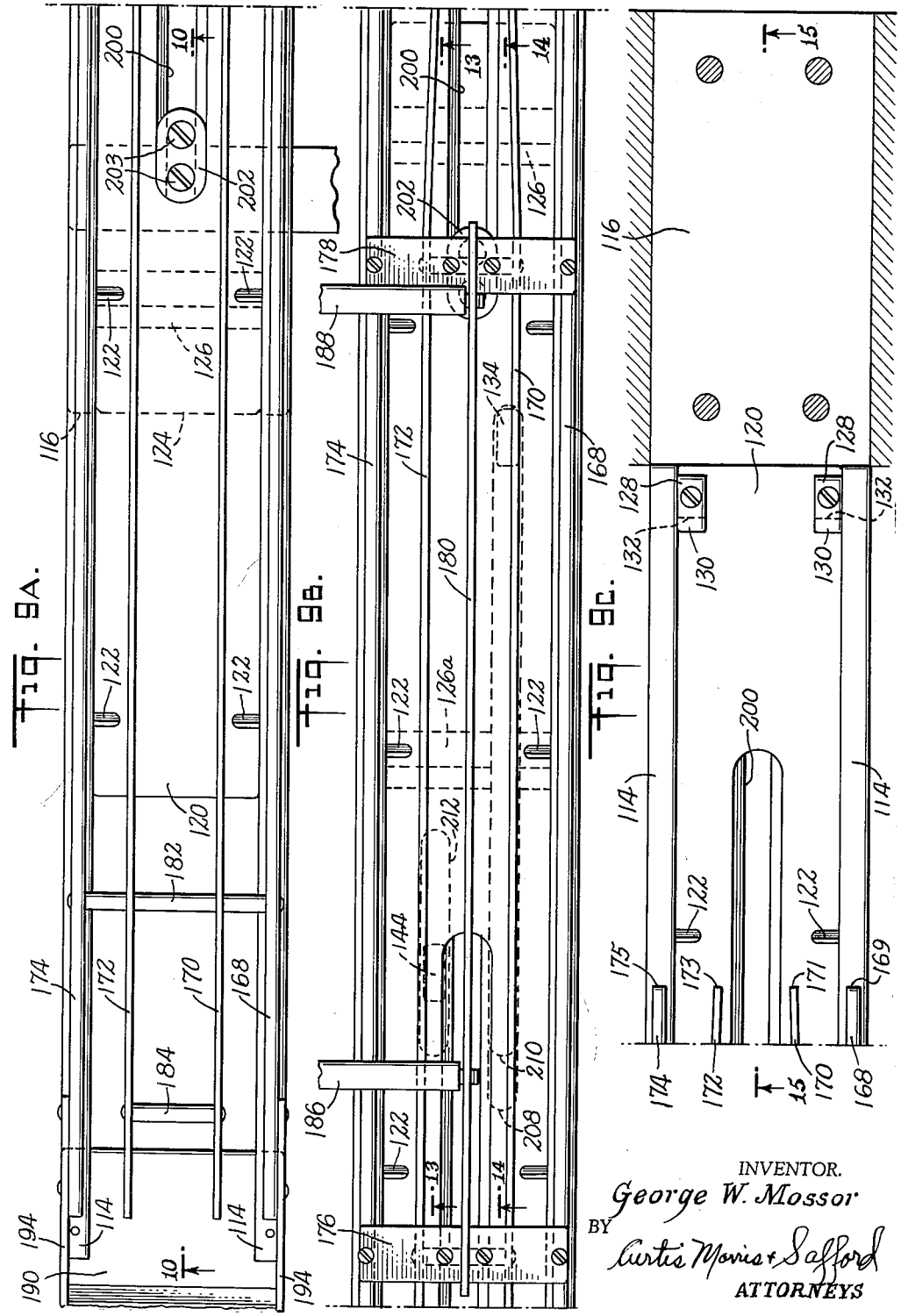

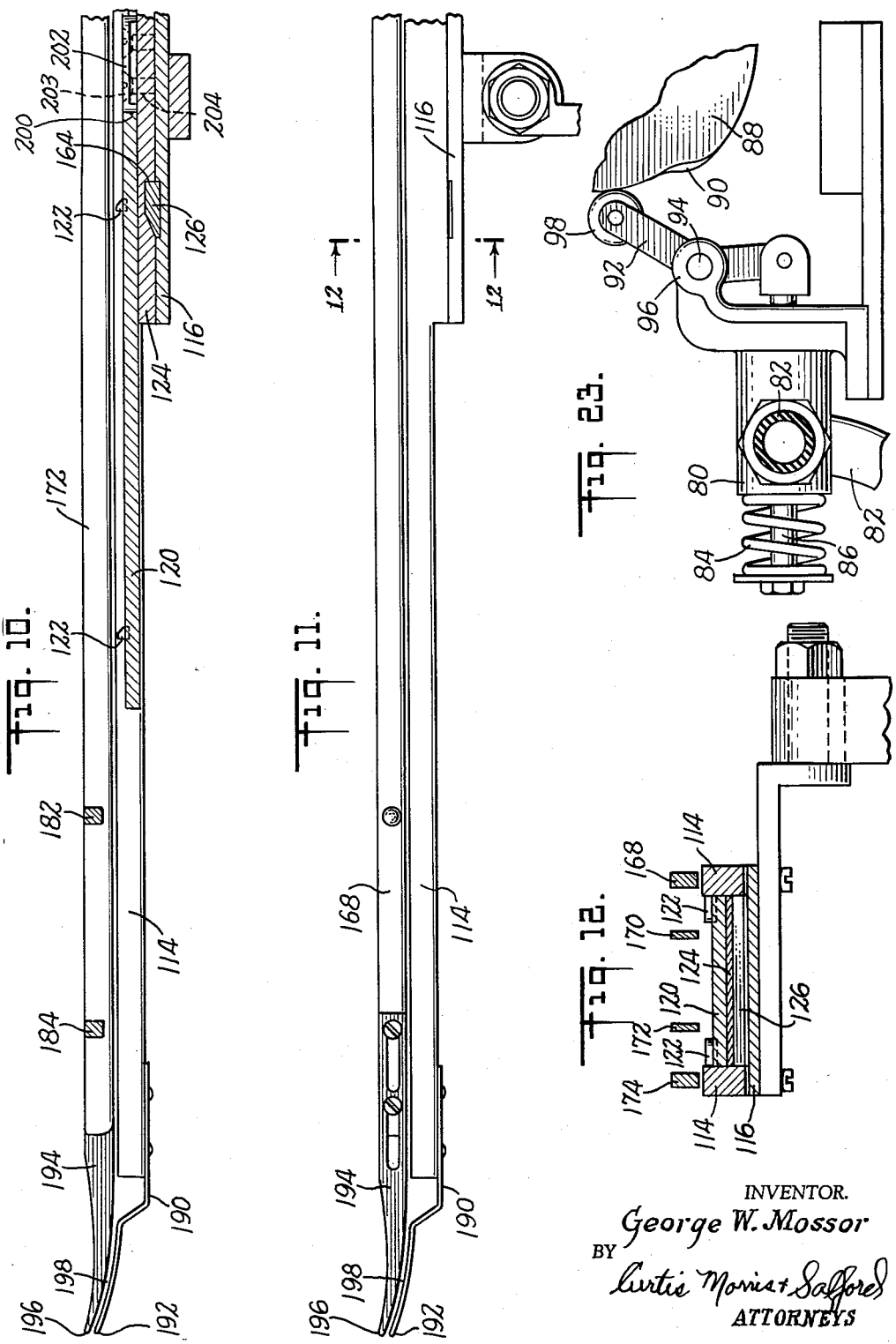

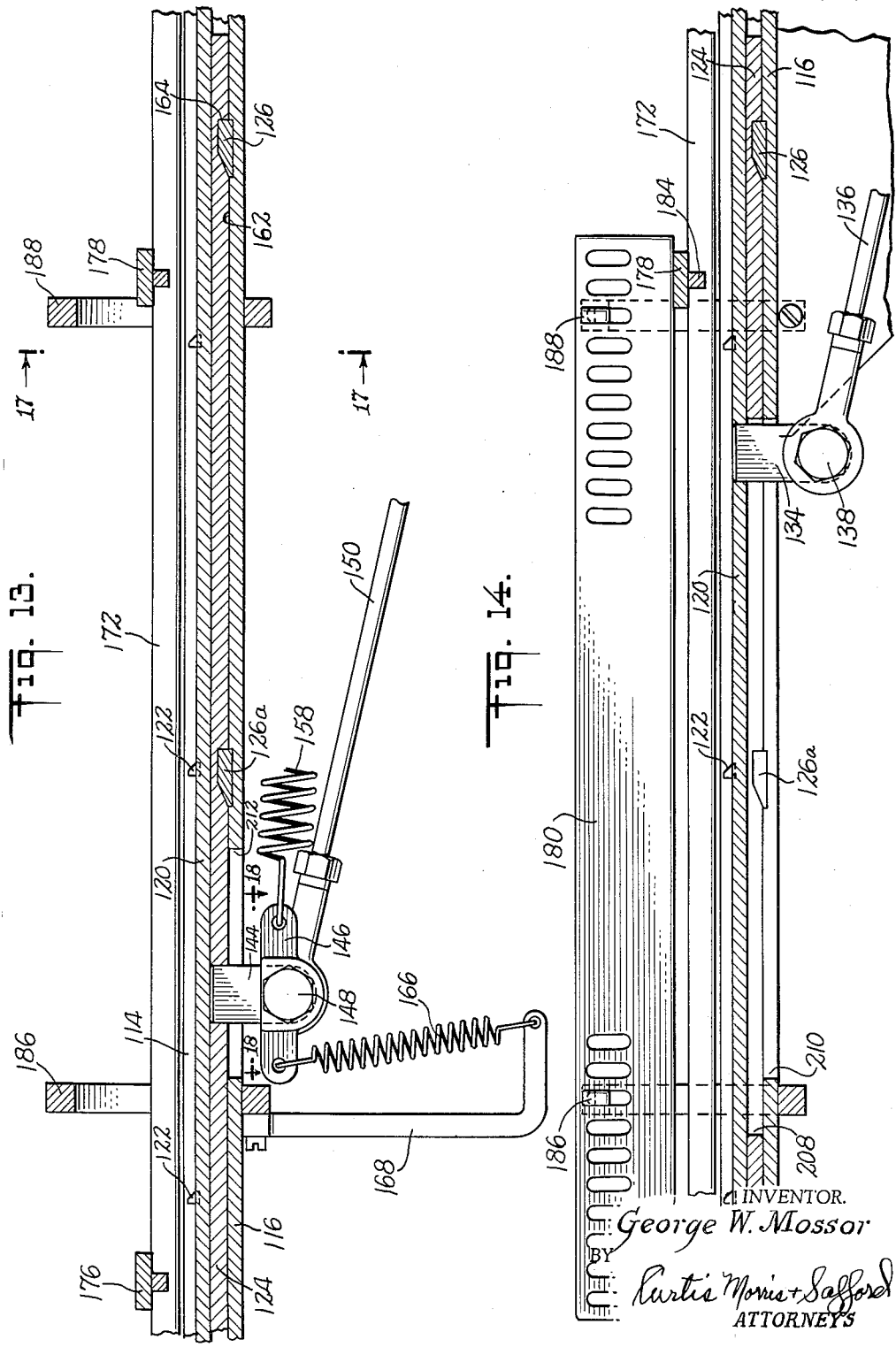

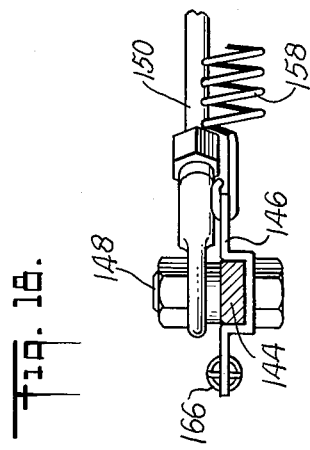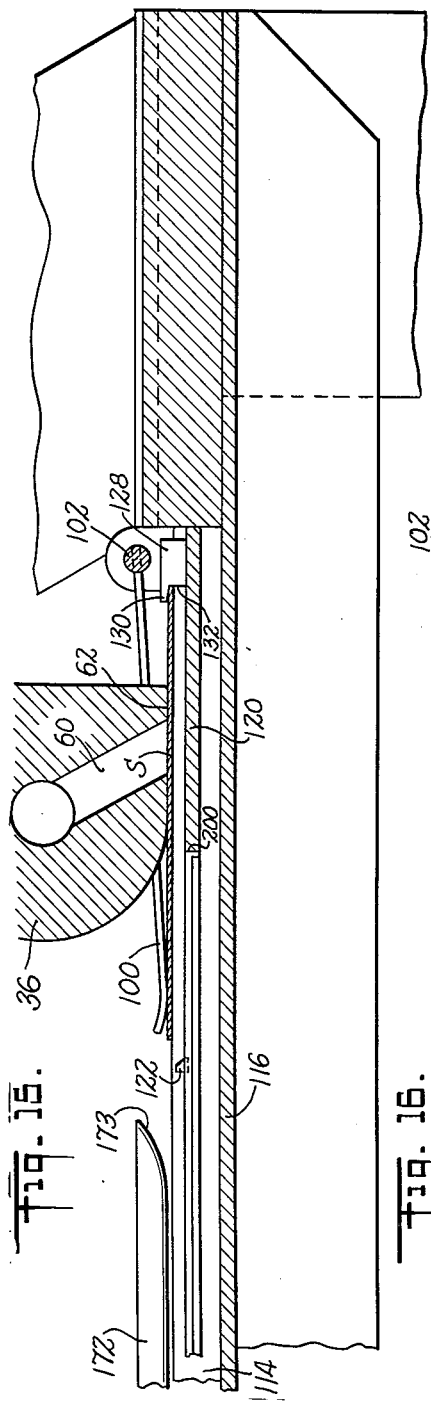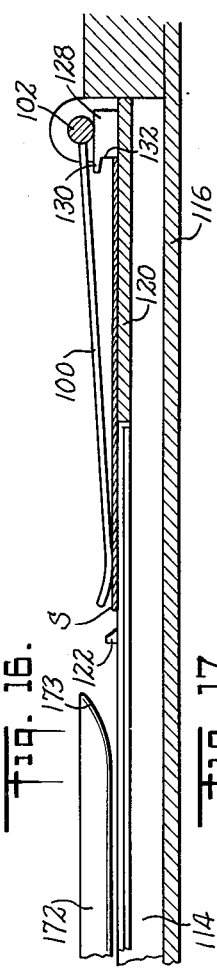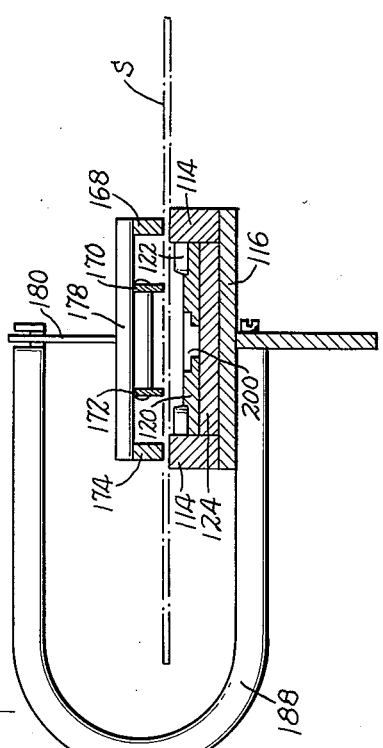

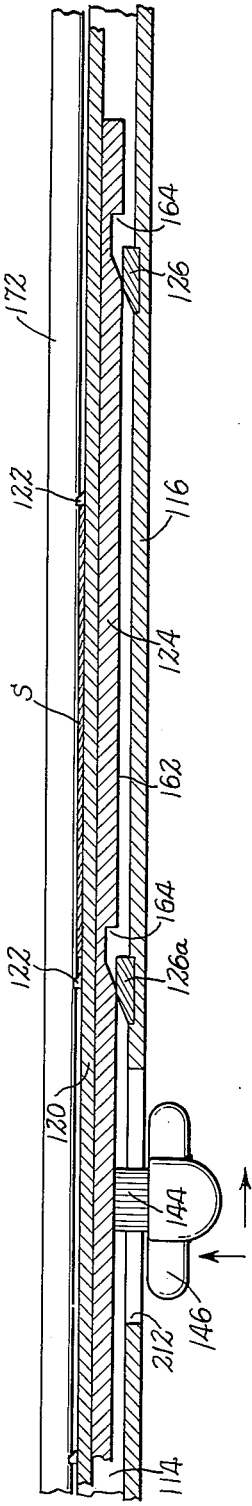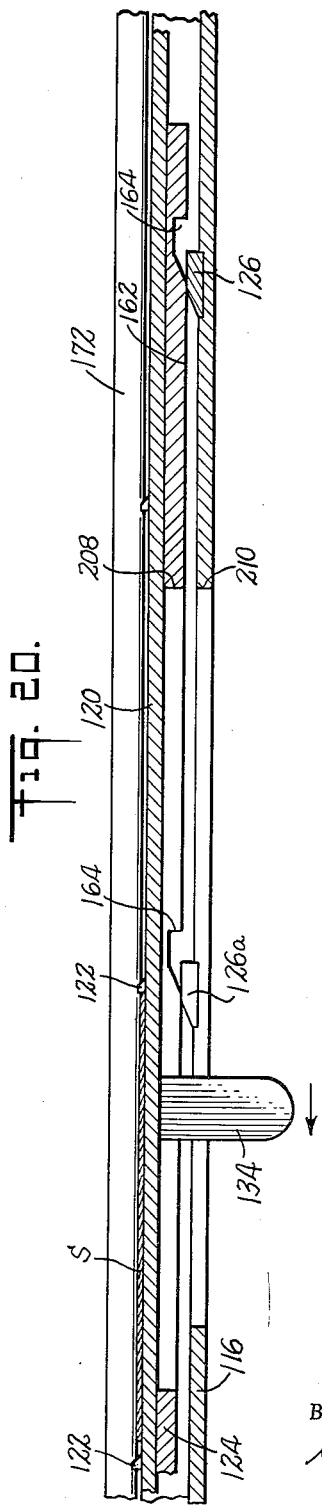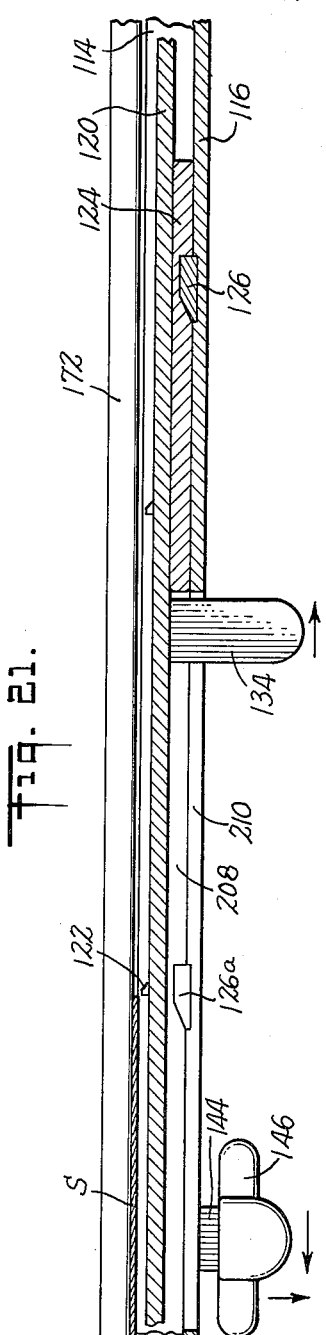

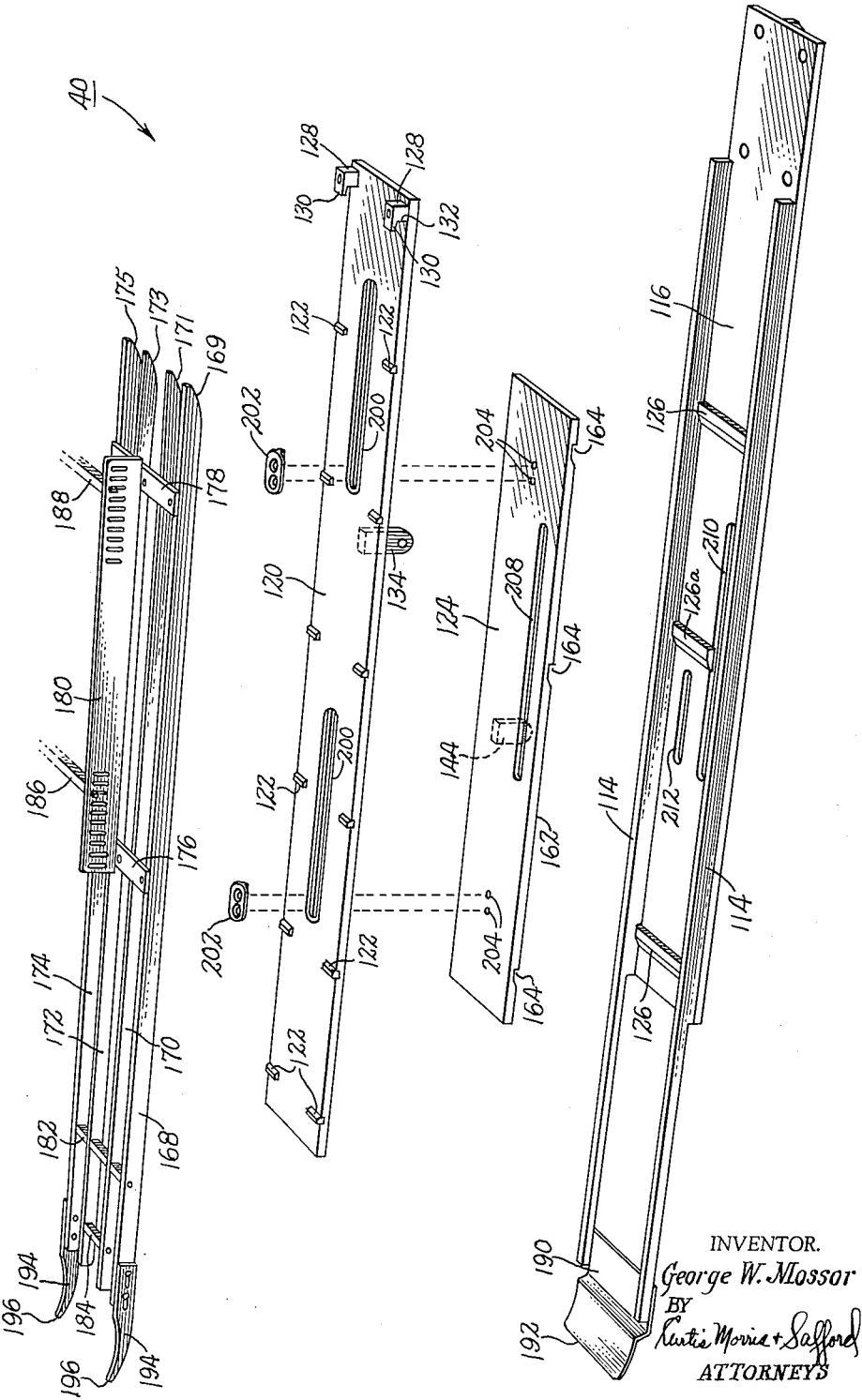

United States Patent Office 3,021,766
Patented Feb. 20, 1962

3,021,766
MATERIAL HANDLING APPARATUS
George W. Mossor, Wellsburg, W. Va., assignor to Hudson Pulp & Paper Corp., New York, N.Y., a corporation of Maine
Filed Aug. 5, 1957, Ser. No. 676,342
9 Claims. (Cl. 93—8)

This invention relates to handling product components in manufacturing operations and more particularly to apparatus for feeding and applying paper sleeves to partially formed paper bags as they move through a bag making machine.

Paper bags, particularly multi-wall bags, are well suited for packaging powdered, pulverized or granular materials of a fine and small grain size. In bags of this type, the ends are usually formed and closed prior to being filled. One end of such bags has a filling valve formed between folded flaps. The bag is filled by delivering the bulk material through the valve as by blowing it therethrough. After the bag has been filled, the contents tend to hold the valve closed during shipment and storage. However, some material is apt to sift through the valve and it is a common practice to provide a sleeve extension on the valve which projects either inwardly or outwardly from the valve. When such an outwardly projecting sleeve is used, the sleeve is twisted and tucked into the valve opening after the bag has been filled to insure a complete closure.

Sleeves are applied both to bags having sewed end closures and to bags having pasted end closures. With bags having pasted end closures, flaps at the end are coated with paste, folded over each other and pressed into sealing engagement. The sleeve is applied to the pasted surfaces of the flaps before they are folded over each other and the sleeve forms the valve opening.

Heretofore, such sleeves have been inserted into the formed bags by hand. This operation is not only slow and tedious, but also expensive. It is therefore an object of this invention to provide automatic apparatus for positioning the sleeves so that they may be incorporated into a paper bag while the bag is being formed on a bag making machine.

Another object is to provide paper sleeves to bags of the type having pasted end closure flaps.

Another object is to intermittently feed a paper sleeve in timed relation to a continuously moving bag to apply it to the open end of the bag.

It is another object to provide apparatus for transferring paper sleeves from a remote source of supply to a bag making machine and insert a sleeve in each partially formed bag as the bag moves through the bag making machine.

Another object is to provide an apparatus of the type indicated for applying either an inwardly or outwardly directed sleeve at either side of the bag.

It is a further object to provide a sleeve inserting apparatus for use with a bag making machine that is of a relatively simple and compact construction, reliable in operation and one that may be easily and quickly adjusted to operate in timed sequence with a related bag making machine.

In the accompanying drawings, a preferred embodiment of the present invention is shown and the same is described in detail in the specification. However, it is to be understood that the drawings and description are not intended to be either exhaustive or limiting of the invention, but on the contrary, are for the purpose of illustrating and describing the invention in order that others skilled in the art may fully understand the invention its principles and the application thereof, and that they may embody it and adapt it in numerous forms, each as may be best suited to the requirements of the particular usage.

In the drawings:

FIGURE 1 is a side elevational view of a portion of a bag making machine and showing a sleeve applying apparatus used in conjunction therewith which incorporates the novel features of the present invention;

FIGURE 1a is a sectional view along lines 1a—1a of FIGURE 1 showing a paper bag with an unfolded end being fed through the bag making machine;

FIGURE 1b is a view of the open end of the bag illustrated in FIGURE 1a and showing a sleeve applied thereto;

FIGURE 1c is a view similar to FIGURE 1b showing the lower flap and sleeve folded to closing position; and FIGURE 1d is a view similar to FIGURE 1b and showing the other flap folded to complete the closure and form the valve sleeve;

FIGURE 2 is a sectional plan view taken along lines 2—2 of FIGURE 1 showing the main and counter drive shafts of the sleeve applying unit;

FIGURE 3 is a sectional view taken along lines 3—3 of FIGURE 2 to show a portion of the transfer apparatus for handling the paper valve sleeves;

FIGURE 4 is a sectional view taken along lines 4—4 of FIGURE 3 to show the sleeve transfer head in position to remove a sleeve from the supply magazine;

FIGURE 5 is a sectional view taken along lines 5—5 of FIGURE 2 to show the cam and drive arrangement for actuating the sleeve transfer and stripping means;

FIGURE 6 is a sectional view taken along lines 6—6 of FIGURE 2 to show the carriage on which the sleeve transfer head is mounted and the operating means for reciprocating the carriage;

FIGURE 7 is a top sectional view taken along lines 7—7 of FIGURE 6 showing the manner of mounting the sleeve transfer head for rotation on the carriage;

FIGURE 8 is a sectional view taken along lines 8—8 of FIGURE 7 to show the gear and rack arrangement for rotating the sleeve transfer head on the carriage;

FIGURES 9a, 9b and 9c are top plan views of successive sections of the conveyor along which sleeves are advanced;

FIGURE 10 is a sectional view taken along lines 10—10 of FIGURE 9a to show forward end portion of the conveyor for applying sleeves to partially formed bags;

FIGURE 11 is a partial side view of the forward portion of the conveyor shown in FIGURE 10;

FIGURE 12 is a transverse sectional view of the conveyor taken along lines 12—12 of FIGURE 11 to show the relationship of the elements thereof;

FIGURE 13 is a sectional view taken along lines 13—13 of that portion of the conveyor shown in FIGURE 9b;

FIGURE 14 is a sectional view taken along lines 14—14 of that portion of the conveyor shown in FIGURE 9b;

FIGURE 15 is a sectional view taken along lines 15—15 of that portion of the conveyor shown in FIGURE 9c;

FIGURE 16 is a sectional view of a portion of the conveyor shown in FIGURE 15;

FIGURE 17 is a transverse sectional view taken along lines 17—17 of FIGURE 13 to show the friction rails for engaging the sleeves;

FIGURE 18 is a sectional view taken along lines 18—18 of FIGURE 9c to show the connection between the operating pitman and depending lug on the lift plate;

FIGURE 19 is a longitudinal sectional view of a portion of the conveyor and showing the sleeve feeding plate raised and a valve sleeve in position to be advanced;

FIGURE 20 is a sectional view of the conveyor similar to FIGURE 19 and showing the sleeve feeding plate moved through a forward feeding stroke to advance the sleeve through one station;

FIGURE 21 is a sectional view of the conveyor similar to FIGURE 19 and showing the sleeve feeding plate lowered out of the path of the valve sleeves for movement through a return stroke;

FIGURE 22 is an exploded view of the components of the conveyor of the sleeve transfer and applying apparatus;

FIGURE 23 is an enlarged view of the suction control valve illustrated in FIGURE 1.

The illustrated embodiment is an integrated apparatus for automatically transferring paper sleeves from a storage magazine to a paper bag being formed on a bag making machine. The partially illustrated bag making machine is a standard type known as a Coty "doubler-ender." The "double-ender" machine is one which forms a multi-wall paper tube into a closed bag that has 4 pasted closure flaps at each end. As previously stated paper valve sleeves were formerly inserted by hand between the pasted flaps at one end of the bag before the flaps are folded over each other to close that end. The apparatus of the present invention feeds a sleeve to and applies it in a bag being formed on the "double-ender" machine.

In general the sleeve insertion apparatus shown in the drawings comprises a supporting conveyor frame having guide tracks along which the sleeves are advanced in sequence and delivered in proper position to a bag moving through the "double-ender" machine. The apparatus removes the sleeves one at a time from a storage magazine by means of a unique suction pick up and transfer mechanism. Each sleeve is initially positioned on the guide tracks on the conveyor frame. After the sleeve has been placed on the conveyor frame, it is removed from the pick up mechanism by stripper fingers and at which time the suction is shut off to facilitate removal of the sleeve. The mechanism is then returned to pick up another sleeve. While the pick up and transfer mechanism is being returned to obtain another sleeve, a feed plate, which is located beneath the guide tracks of the conveyor frame, is moved forwardly through a feeding stroke. The feed plate has upwardly projecting fingers thereon positioned to the rear of the newly deposited sleeve to engage and advance the paper sleeve along the guide tracks to a first intermediate station along the tracks. The feed plate is then lowered so that its projecting fingers are located beneath the path of the sleeve. The plate is then moved rearwardly through a return stroke until the first set of projecting fingers are once again just to the rear of a second sleeve that the pick up mechanism has deposited on the guide track.

In a similar manner the second sleeve is advanced along the guide tracks. At the same time the first sleeve is advanced to a second intermediate station by means of another set of projecting fingers on the feed plate. This operation is repeated and the sleeves advanced in sequence through a variable number of intermediate stations by other sets of fingers until a final end station is reached where the sleeves are applied to the open end of a bag being formed on the bag making machine.

The bags are formed as they move in succession through the "double-ender" machine at the same rate that the sleeves are moved through the sleeve inserting apparatus. In order to insure proper regulation of the timed feeding of the sleeves to the bag making machine, the sleeve inserting apparatus is driven by a power take off from the drive for the bag making machine. By using the same drive sources various cam actions and reciprocating movements in the sleeve inserting apparatus are thus easily timed and coordinated to permit automatic movement of the sleeves.

Referring to the drawings and to FIGURES 1 to 1d in particular, the sleeve inserting apparatus 8 is shown in operative relation to a Coty "double-ender" bag making machine 10. Only that portion of the bag making machine 10 is illustrated which is necessary to permit proper understanding of the sleeve inserting apparatus 8.

The bag making machine 10 has conveyor belts 12 for conveying multi-wall paper tube 14 through a series of bag forming operations. When the tube or partially completed bag 14 reaches that portion of the double-ender illustrated in FIGURE 1, one end 14a has been folded to form end flaps, the flaps pasted and folded one over the other to close and seal the end. At the other end 14b of the tube 14, edge portions 14c and 14d (see FIGURES 1a to 1d) of the tube have been folded inwardly and the forward side folded downwardly to form upper and lower open flaps 14e and 14f. However, these flaps have not been creased transversely or pasted for sealing. As the open end of a bag passes over the paste head 16 which has been coated with paste by the roll 18, the paste head 16 applies the necessary paste to the opposed flaps of the partially formed tube 14. The tube 14 is then carried along to a marking station where a marking roll 20 transversely creases the end flaps on the unsealed end, as indicated by dot and dash lines X and Y in FIGURES 1a to 1d, to provide fold lines about which the flaps will be folded to overlie each other.

Normally the tube 14, would be carried directly to a bag closing unit 22 where the pasted end flaps would be folded one over the other and pressed between pressure rolls to close the end as illustrated in FIGURES 1a to 1d. The completed bag then would be carried along between two belts 24 and 26, deposited on a slide 28 and then stored. However, when the double-ender machine is operated with the sleeve inserting apparatus of the present invention, the conveyor belt 12 releases the tube 14 at zone 30 and transfers it to a second set of belts 24 and 26. Belts 12 run over a pulley 27 positioned opposite pulleys 29 over which the belts 26 run to control the movement of each bag as it leaves the belts 12. Pulley 31, over which belt 24 runs, is spaced from pulley 27 and the end of the sleeve inserting apparatus projects between the spaced pulleys to apply a sleeve. The sleeve S is applied just before belt 24 comes into alignment with belt 26 so that it is immediately gripped between the belts as the bag tube 14 moves through the bag making machine. A back up pad 32 is provided behind belt 26 to facilitate positioning the sleeve in the passing tube. The tube with the pasted in sleeve is now carried along by the bag making machine in the same manner as previously described, except that the travel to slide 28 is lengthened to permit complete sealing of the sleeve into the bag.

The positioning of the sleeve S as it is applied to the bag tube 14 at the transfer zone 30 is shown in FIGURE 1a. The sleeve in the illustrated embodiment is positioned against the open end of the bag tube and then carried along with the bag and the tube end is sealed. A sealed bag with a paper sleeve incorporated therein is shown in FIGURE 1d.

The sleeve inserting apparatus 8 has a storage magazine 34 where a ready supply of paper sleeves are stacked. To move a sleeve from this source of supply to the transfer zone 30, handling means is provided which is operated in time relation with the passage of tubes through the bag making machine 10. This is accomplished by having the driving force for the sleeve insert machine supplied by a power take off from the double-ender drive means. In order to move the operative elements of the sleeve inserting apparatus in timed relation with the passage of tubes through transfer zone 30, a common power drive for these and other related mechanisms is furnished by the drive shaft 42 which, in turn, is driven by the power drive of the double-ender bag making machine. Mounted upon shaft 42 is a sprocket 44 for driving a chain 46 which extends over another sprocket 48 on the main drive shaft 50 of the sleeve inserting apparatus. As shown in FIGURE 2 a driven gear 52 on the shaft 50 meshes with a gear 54 mounted on a counter drive shaft 56. Shafts 50 and 56 are rotatably mounted on a rugged central frame 57, which is normally securely anchored in place. However, the frame 57 may be mounted on tracks (not shown) which are parallel to the shaft 42. With such an arrangement the apparatus 8 may be shifted as a unit to permit sleeves to be deposited at different transverse points in zone 30.

As shown in FIGURES 3 and 4 the magazine 34 comprises corner angle pieces 35 and side plates 37 within which the sleeves are stored. The magazine is supported on the frame of conveyor 40 which is supported in turn on the central frame 57. The bottom of the magazine 34 is substantially open, but fixed lug plates 39 and adjustable resilient wire loops 41 support the stored sleeves S. The wire loops 41 are resilient to permit easy removal of the sleeves from the magazine.

As shown in FIGURE 1, the sleeve inserting apparatus comprises a pick up head 36 with a suction or vacuum opening 60 therein which removes the bottom sleeve S from the magazine 34. The suction pick up head 36 carries the sleeve downwardly and rearwardly and deposits it on conveyor 40 which intermittently advances the sleeve through a series of stations until it is applied to a passing tube at transfer point 30. The pick up head 36 is connected to a compressor 58 which serves as a negative pressure source and creates a suction effect through openings 60 in the face 62 of the head 36. When the face 62 is pressed against the bottom sleeve in the magazine 34 as shown in FIGURES 1 and 4, the suction holds the sleeve against the head 36. When the head is turned away from the magazine 34 and located as shown in FIGURE 3 face 62 of the head 36 with the attached sleeve overlays the conveyor 40.

In order to move the head 36 from the magazine to the position above the conveyor 40, a novel carriage 66 is provided. The carriage 66 is shown in detail in FIGURES 6, 7 and 8. Head 36 is mounted on a hollow shaft 64 which is, in turn, rotatably mounted on the frame of carriage 66. A gear 68 is mounted fast on shaft 64 within the frame of carriage 66 and meshes with a rack 70 in a fixed guide 71. The frame of carriage 66 surrounds the guide 71 and travels along the guide when the gear 68 is driven up or down the rack 70. To permit the carriage 66 to ride freely along the guide 71, rollers 72 and 73 are positioned against the back 74 of the guide 71 and the front of the guide at either side of the track. The carriage 66 is driven up and down the guide 71 by means of a connecting rod 76 having one end connected to the carriage and its opposite end attached eccentrically to a disc 78 that is mounted on the end of the counter drive shaft 56. As the carriage 66 moves down the guide 71 gear 68 is rotated as it meshes with the rack 70. Gear 68 rotates the hollow shaft 64 and the attached pickup head 36. The head 36 is illustrated in FIGURES 1, 3 and 15 rotates in a counterclockwise direction during the downward travel of the carriage 66. At the bottom of the downward travel of the carriage 66, the head 36 has rotated and moved to the second position shown in FIGURE 3 so that the attached sleeve overlies the conveyor 40.

To permit easy removal of the sleeve from the head 36 the suction effect is terminated by a three way valve 80 in the line 82 connecting the compressor 58 with the hollow shaft 64. This valve 80 is fixed on an extension of the frame 57 and a spring 84 is fitted on the valve stem 86 and tends to hold the valve connection of line 82 with shaft 64 closed. To open the valve connection with shaft 64 an adustable cam is provided. This cam comprises two similarly shaped plates 88 and 90. Plate 88 is free to rotate on shaft 50 but it is adjustably joined to plate 90 which is mounted fast on the drive shaft 50. Using this arrangement the duration of the suction effect is easily changed.

The other end of the valve stem 86 which extends through the valve 80 and away from the spring 84 is pivotally connected to a lever 92. The lever 92 is pivoted at an intermediate point 94 to an arm 96 extending from the casing of valve 80. The unattached end of lever 90 is fitted with a roller 98 which is positioned against cam 88 and serves as a follower.

During the downward travel of the carriage 66 the follower 98 rides on the low side of cam 88 permitting the valve 80 to remain open to shaft 64. Cam 88 is so timed that its high side rotates past the follower 98 just before the sleeve 38 is placed on the transfer means 40. When the follower 98 rides on the high side of cam 88 the valve connection with shaft 64 is closed against the force of spring 84.

With the valve connection shut off the suction effect through the openings 60 is terminated. However, to insure that the sleeve S will be properly deposited on the conveyor, a stripper is provided. The stripper comprises wire fingers 100 which are fixed on a rock shaft 102 and so operated that they overlay the sleeve when it is positioned on the conveyor 40 at the end of the downward travel of carriage 66.

As shown in FIGURE 5, the rock shaft 102 has a lever 104 fixedly mounted thereon at one end and connected at its other end to a spring 106. The other end of spring 106 is secured to a frame lug 105 at an opening 107 therein. Spring 106 urges lever 104 downwardly causing shaft 102 to rotate and place fingers 100 over the sleeve S on the conveyor 40. Another lever 108 is also fixedly mounted at one end on shaft 102. The free end of lever 108 has a follower roller 110 which rides on a cam plate 112 that is adaptably mounted on the counter drive shaft 56 to permit change in time setting. When the roller 110 rides on the high side of cam 112, lever arm 104 is raised and the stripper fingers 100 rocked upwardly by the movement of shaft 102. The rotation of cam 112 is so timed that the roller 110 is in contact with the high side of the cam during the latter stage of the downward travel of the sleeve holding head 36. When the sleeve S has been positioned immediately above the conveyor 40, the follower 110 rides on to the low side of cam 112 and the fingers are rocked downwardly so that they overlay the sleeve just prior to the shutting off of the valve connection to the pickup head 36. The fingers 100 remain on top of the sleeve as the head 36 begins its reciprocal travel back to the magazine 34 to pick up the next sleeve.

The conveyor 40 comprises a set of spaced guide tracks 114 mounted on the sides of a supporting frame plate 116. The suction head 36 sets the sleeve S on these guide tracks 114. As described previously the sleeve S is advanced along the guide tracks 114 by means of a feed plate 120 having upwardly projecting pairs of spaced sleeve pushing lugs 122 mounted thereon. The pairs of pushing lugs 122 are spaced from each other longitudinally of the feed plate a distance greater than the extent of the sleeves along the tracks 114 and substantially equal to the forward stroke of the feed plate. The lugs 122 are raised into and lowered out of the path of the sleeves as the sleeves advance along the tracks 114.

As shown in detail in FIGURES 19–22, the feed plate 120 is raised and lowered by means of a lift plate 124 that is mounted on the supporting plate 116 and slidable relative to plate 120. The lift plate 124 itself is raised and lowered by longitudinal movemet relative to cams in the form of beveled lug bars 126 on the supporting plate 116.

The feed plate 120 has upwardly projecting abutments 128 at its rearward end adjacent the position where the sleeve is initially positioned on the guide tracks 114 as shown in FIGURES 1, 3 and 9c. These abutments 128 have a raised portion with a forwardly projecting overhanging flange 130 which extends over the initially positioned sleeve S. The flange 130 is fixed sufficiently high above the advance plate 120 so that it is always above the path of the sleeve as shown in FIGURES 15 and 16.

When a sleeve is first positioned on the guide tracks 114 by the pickup head 36 and the stripper finger 100, it is set against the face portion 132 of the abutments 128. The sleeve is advanced from this initial position to a first intermediate station by moving the feed plate 120 forward.

The feed plate 120 is reciprocated through forward and returned strokes by a pitman 136 pivotally connected at 138 to a lug 134 depending from the underportion of the plate 120. Lug 134 projects through slots in the underlying left and supporting plates 124 and 116 as later explained in detail. The opposite end of pitman 136 is pivotally connected to a crank pin 142 projecting from a disc 140 eccentrically thereof. Disc 140 is mounted fast on the driven counter shaft 56. As the disc 140 rotates the feed plate 120 is driven forwardly and then returned to its initial position by the eccentric crank pin 142 and pitman 136 during each revolution of the shaft 56.

The upwardly projecting lugs 122 are mounted on the feed plate 120 at spaced intervals so that each forward stroke of the feed plate 120 advances the sleeve at each station into the next adjacent station. During its return stroke, the feed plate 120 and upwardly projecting lugs 122 are lowered below the sleeves.

As stated previously the lift plate 124 is slidably attached to the feed plate 120. This permits the feed plate 120 to slide forward or backwards when lift plate 124 is at rest. However, the plates are so joined that when lift plate 124 is raised or lowered it raises or lowers the feed plate 120 with it.

The lift plate 124 has a lug 144 affixed to its underportion and a link 146 is joined to the end of the lug 144 intermediate its ends by a pivot pin 148. A pitman 150 also is pivotally connected at one end to the lug 144 by pin 148. The pitman 150 has a "Scotch Yoke" frame 152 at its opposite end which is slidably fitted on a block 160 that is mounted to rock on to the counter shaft 56. A plate cam 154 is mounted on shaft 56 and a follower roller 156 projects from the side of frame 152 to ride on cam 154.

A strong spring 158 is connected to the link 146 and tends to pull lift plate 124 rearwardly along the supporting plate 116 of conveyor 40. Acting against the pull of spring 158 is the forward thrust which is imparted to the pitman 150 when the follower 156 rides on the high side of cam 154.

The underside 162 of lift plate 124 slides on the supporting plate 116 and has recesses 164 therein which are spaced therealong at the same intervals as the cam lug bars 126 on the supporting plate. When the pitman 150 is driven forward, the lift plate is moved forwardly to align the recesses 164 with the cam bars 126. To insure that the openings 164 and the bars 126 are moved into overlying relation, a spring 166 is attached at one end to the forward end of link 146 and the other end of the spring 166 is attached to an angle arm 168 mounted on the support frame 116 at a suitable distance beneath the link 146.

When the follower 156 rides on the low side of cam 154 spring 158 slides pitman 150 and its "Scotch Yoke" frame 152 along block 160 and carries the lift plate 124 rearwardly. As the lift plate 124 moves back the recessed openings 164 moves out of mated relation with the lug bars 126 and plate 124 rides up on to the top of the bars camming the lift plate 124 upwardly. Since the advance plate 120 overlies the lift plate 124 it is also raised.

The camming of the lift plate 124 is so timed that it is in the raised or cammed position when the feed plate 120 is driven through a forward stroke to push the sleeves to the next station. While the feed plate 120 is being driven through a return stroke its initial position, the lift plate 124 is thrust forward so that the openings 164 in lift plate 124 and the bars 126 on the supporting plate are brought into register, thus lowering the feed plate and dropping the projecting lugs 122 below the path of the sleeves S. The feed plate 120 remains lowered until the lugs 122 are positioned to the rear of the sleeves to be advanced.

When the lugs 122 are positioned at the rear of the sleeves, the lift plate 124 is again cammed up to raise the feed plate 120 before it is driven forward through its next feed stroke.

Since the sleeves S that are being advanced in sequence along the tracks 114 are generally thin and flexible a unique hold down means is provided for keeping the sleeves flat against the tracks 114 as they are advanced. The hold down means is shown in more detail in FIGURES 9–12, 17 and 22. The hold down means comprises four bars, 168, 170, 172 and 174, positioned immediately above the path of the sleeves. The rearward ends 169, 171, 173 and 175 of the bars 168, 170, 172 and 174 are set forwardly of the initial sleeve position on the conveyor 40 so as not to interfere with sleeves being deposited by the holding head 36. These rearward ends of the bars are beveled in order to provide easy entrance of the sleeves into the guideway formed by the bars 168—174 and the guide tracks 114.

The bars 168—174 are attached to cross-members 176 and 178 which, in turn, are attached to a slotted plate 180. In addition to the cross-members 176 and 178 the hold down bars are also kept in spaced relation by the spreader bars 182 and 184. The slotted plate 180 is supported by two cantilever U-shaped brackets 186 and 188 mounted on the supporting frame plate 116 of the conveyor 40. Due to their cantilever support the bars 168—174 are in resilient and touching contact with the moving sleeves to hold them in their proper position on tracks 114, but this contact is not sufficient to prevent smooth passage of the sleeves through the guide means. The plate 180 is adjustably attached to the brackets 186 and 188 so that the bars 168—174 may be raised or lowered to adjust the pressure applied to the sleeves as required.

When the sleeves S approach the end of their travel along the conveyor 40, they must be properly oriented for delivery to and positioning in the double-ender machine. This is accomplished in the illustrated sleeve insert apparatus by positioning guide means fitted on the end of the hold down bars and the supporting plate 114. Details of the positioning means are shown in more particular in FIGURES 10, 11, and 22.

The positioning means comprises a guide plate 190 affixed to the end of the supporting plate 116 and guide fingers 194 attached to the outer hold down bars 168 and 174. The forward portion 192 of plate 190 projects beyond supporting plate 116 and is curved upwardly to form a smooth arc and the end portions 196 of the fingers 194 also are turned upwardly along a line generally conforming to the curved forward position 192 of plate 190 to form a guideway 198 therebetween. The guideway 198 is a continuation of the passageway provided between bars 168—174 and underlying guide tracks 114.

The forwardmost lug 122 on feed plate 120 pushes each sleeve S from the last station along tracks 114 through guideway 198 and into position on the partially formed bag being moved through zone 30 to belt 26 of the bag making machine.

One of the features of the present invention is the construction and arrangement of the elements of conveyor 40 to feed a sleeve in timed relation to the movement of the open end of a partially formed bag through zone 30 to position a sleeve on the valve of the bag just prior to its entrance into the bight between the belts 24 and 26. This is accomplished in part by synchronizing the driving of the reciprocating feed plate 120 through a sleeve feeding stroke with the continuous movement of the valve portion of a bag through zone 30 by means of the common drive shaft 42, see FIGURE 1. It is also accomplished in part by feeding a sleeve forwardly from the end of conveyor 40 at a speed to cause it to lay on the valve portion of a bag as it moves through the bag making machines. Furthermore, the position of the ends of the forwardly projecting guide plate 190 and fingers 194 of conveyor 40 closely adjacent a partially formed bag and the curved contour of the plate and fingers controls the direction of movement of a sleeve and the insertion of a sleeve into the bag at exactly the right position.

To feed the sleeves S intermittently along the guide tracks 114 the feed plate 120, the lift plate 124 and the cam bars 126 must cooperate in the manner as set forth hereinbefore. The details of the components comprising the conveyor are set forth more fully in the exploded view of FIGURE 22 and in FIGURES 9a, b and c, 19, 20 and 21.

Since the feed plate 120 must be reciprocated in timed relation to the slidable lift plate 124, two slotted openings 200 are provided in the feed plate. Fasteners 202 are inserted through the openings 200 and fixed to lift plate 124 by bolts 203 at the openings 204. The fasteners 202 are secured sufficiently to keep the feed and lift plates 120 and 124 in contact, but yet are loose enough to permit plate 120 to slide with respect to plate 124.

The lug 134 which is secured to the bottom of plate 120 fits through an elongated opening 208 in lift plate 124. The lug 134 is pivotally connected to the pitman 136 and as the feed plate 120 is moved back and forth the arm 134 is free to travel in the opening 208. A similar opening 210 is provided in the supporting plate 116 through which the lug 134 also passes.

Since recesses 164 of the lift plate 124 must be moved in and out of register with the cam bars 126, a slot 212 is provided in the supporting plate 116 through which the lug 144 passes and within which it is free to be moved back and forth.

It will be noted that lug bar 126a which overlays opening 210 is cut away where it passes over that opening. Since the bottom 162 of the lift plate 124 need only be in contact with the outer portions of the bar 126a to achieve the camming action the cut away portion has no adverse effect.

Another feature of the present invention is the unitary construction of the sleeve feeding and applying apparatus to adapt it to be moved bodily as a unit relative to the bag making machine. Such construction permit a quick and easy adjustment to apply either inwardly or outwardly directed sleeves to the valve at either side of the bag. Thus, by moving the sleeve feeding and applying apparatus to the left of the position illustrated in FIGURES 1b and 2, the sleeve S will be applied to the left side instead of the right hand side of the bag as illustrated in FIGURE 1b.

Throughout the illustrated machine it will be noted that rugged and easily maintained parts have been used. It is also to be noted that the various cam and drives are easily adjusted to permit quick and effective correction of operating difficulties. To reduce fluctuations in the various timed cam movements a heavily weighted fly wheel 214 is mounted on the end of the drive shaft 50.

The above described embodiment and its method of operation are merely illustrative of the present invention and are set forth to provide a full understanding of this invention and its many benefits and advantages. To those gifted in the art, modifications will occur which will come within the scope and spirit of the present invention as defined in the following claims.

I claim:

1. In a bag making machine having belts for advancing successive partially formed bags to one zone in the machine at a constant velocity and separate belts for advancing the partially formed bags from said zone to provide a space therebetween, the combination with said bag making machine of an apparatus for transferring sleeves from a remote source to said machine where the sleeves are incorporated into partially formed bags comprising a magazine for holding a stack of said sleeves and having an opening in the bottom through which the sleeves may be withdrawn, a reciprocating conveyor for feeding sleeves to the partially formed bags at the zone between the separate conveyor belts of the bag forming machine, a carriage mounted to slide on a track and having a sleeve transferring head thereon with a suction opening for picking a sleeve from the opening in the bottom of the magazine, means operated by the movement of the carriage to rotate the head comprising a gear mounted on the carriage and connected to the head, a rack on said track engaging said gear and means for moving said carriage along said track, a negative pressure source communicating with said head, a valve for controlling the negative pressure source and suction in said head for transferring sleeves from said magazine to the reciprocating conveyor, said reciprocating conveyor having a stationary support, a feeding plate with pushing lugs for engaging and advancing sleeves along the stationary support, means for actuating said feed plate and pushing lugs thereon through a forward stroke in a path to engage the lugs with the sleeves and advance the sleeves on the support and through a return stroke in a different path out of contact with the sleeves to advance sleeves with a step-by-step motion, and a common driving means for operating said belts, reciprocating conveyor and means for moving the carriage in timed relation to each other to feed a sleeve and bag to the same location simultaneously to overlie each other whereby the sleeve is incorporated in the bag during its continuous movement through the machine.

2. In an apparatus for feeding and applying paper sleeves to partially formed bags, means for moving said paper sleeves from a first position to a second position comprising a movable carriage mounted to slide on a track, a hollow head mounted to rotate on said carriage and having a suction opening for engaging and holding said paper sleeves, means operated by the movement of the carriage to rotate the head comprising a gear mounted on the carriage and connected to the head, a rack on said track engaging said gear and means for moving said carriage along said track whereby said paper holding head is rotated as it is moved by said carriage along a path parallel to said rack, a negative pressure source communicating with said head for creating a suction therein, a valve for controlling the negative pressure source and suction in said head, sleeve stripping means overlying said second position comprising a rock shaft having fingers mounted thereon, said suction effect providing holding means for holding said paper against said head, a cam shaft, and means operated by said cam shaft including the means for moving said carriage, actuating the valve to connect said head to said negative pressure source and the rocking of said fingers in timed relation whereby said fingers overlie said material at said second position and said negative pressure source communicates with said head during the movement of said head to said second position and is then disconnected therefrom.

3. In a paper component handling apparatus, a conveyor for conveying paper components in sequence along a predetermined path, said conveyor comprising spaced guide tracks for supporting successive paper components for movement along said path, feeding means for moving said paper components successively along said path on said guide tracks, said feeding means comprising a member having a plurality of spaced projections thereon for engaging successive paper components to be moved, cam means for raising and lowering said member and plurality of projections in relation to said predetermined path, said cam means comprising a fixed plate having upwardly projecting cam surfaces thereon and a lift plate having recessed cam surfaces registering with said projecting cam surfaces, drive means for reciprocating said feeding means including means for moving said lift plate relative to said fixed plate to raise said projections when said feeding means is moved through a forward stroke to simultaneously advance a plurality of successive components and lower said projections when said feeding means is moved through a return stroke.

4. In an apparatus for feeding and applying paper sleeves to the valve portion of partially formed paper bags, a conveyor comprising a support frame upon which said paper sleeves are moved in a predetermined path, a feed plate mounted to slide on said frame and having projections affixed thereto for moving said paper sleeves from a first to a second position, cam surfaces on said support, a lift plate between said support frame and feed plate and having inclined surfaces acting as a cam follower for moving said feed plate and projections thereon into and out of said predetermined path, drive means for reciprocating said feed plate and lift plate relative to each other in timed relation to cam said lift plate and feed plate upwardly with respect to the support frame during the movement of said feed plate from said first to said second position in one direction whereby said paper is advanced to said second position by said projections extending into said predetermined path.

5. Apparatus for feeding and applying paper sleeves to partially formed bags as defined in claim 4 in which a spring means yieldingly moves said lift plate along said cam plate, said lift plate being intermittently moved against the action of said spring means by said drive means, and said drive means actuating said lift plate and feed plate in timed relation to raise said feed plate during its movement from said first to said second position and lower said feed plate during its movement from said second to said first position.

6. Apparatus for feeding and applying paper sleeves in accordance with claim 4, the combination with said apparatus of a bag making machine for advancing successive partially formed bags to one zone at constant velocity, each of said partially formed bags having inwardly folded flaps at opposite sides thereof in the direction of movement, and means for mounting said conveyor for movement laterally of the direction of movement of the bag blanks to adapt the apparatus to apply inwardly and outwardly projecting sleeves to either side of the bags.

7. Apparatus for feeding and applying paper sleeves in accordance with claim 4, in which the drive means comprises a shaft extending transversely of the conveyor, cams on said drive shaft, and rods operated by said cams and connected to the feed plate and lift plate.

8. Apparatus for feeding and applying paper sleeves in accordance with claim 4, the combination with said apparatus of a magazine, a carriage mounted for movement between said magazine and conveyor, means operated by the movement of said carriage for removing a paper sleeve from the magazine and transferring it to the conveyor, and said drive means connected to move said carriage in timed relation with said feed plate.

9. In a paper component handling apparatus for moving paper sheets in sequence along a predetermined path, a conveyor, sheet transfer means for transferring said sheets from a source of supply to said conveyor, said conveyor having supporting means in the form of spaced rails for supporting said paper sheets, a member overlying said supporting means comprising guide means having spaced rails overlying the rails on said supporting means to define a path therewith for the passage of paper sheets therebetween, resilient means for mounting said member to yieldingly contact its spaced rails with said paper sheet, reciprocating means for engaging and advancing paper sheets along said path between the support means and member, upwardly curved fingers extending from said rails of said overlying member, a curved plate member attached to said support, and said fingers and plate member forming a guideway for orienting said moving paper in an upward direction relative to said predetermined path.

References Cited in the file of this patent

UNITED STATES PATENTS

| | | |
|---|---|---|
| 2,138,343 | Durup | Nov. 29, 1938 |
| 2,251,945 | Labombarde | Aug. 12, 1941 |
| 2,296,146 | Crawford | Sept. 15, 1942 |
| 2,392,983 | Garrison | Jan. 15, 1946 |
| 2,524,417 | Bamber | Oct. 3, 1950 |
| 2,527,295 | Belsher et al. | Oct. 24, 1950 |
| 2,550,160 | Monk | Apr. 24, 1951 |
| 2,559,873 | Grupe | July 10, 1951 |
| 2,655,373 | Laxo | Oct. 13, 1953 |
| 2,663,253 | Sauerman et al. | Dec. 22, 1953 |
| 2,853,296 | Skow | Sept. 23, 1958 |
| 2,867,438 | Hori | Jan. 6, 1959 |